United States Patent
Morotomi et al.

(10) Patent No.: US 10,755,573 B2
(45) Date of Patent: Aug. 25, 2020

(54) COLLISION AVOIDANCE DEVICE

(71) Applicant: TOYOTA JIDOSHA KABUSHIKI KAISHA, Toyota-shi, Aichi-ken (JP)

(72) Inventors: Kohei Morotomi, Shizuoka-ken (JP); Masayuki Katoh, Gotemba (JP); Noriyuki Tsuruoka, Susono (JP)

(73) Assignee: TOYOTA JIDOSHA KABUSHIKI KAISHA, Toyota-shi, Aichi-ken (JP)

( * ) Notice: Subject to any disclaimer, the term of this patent is extended or adjusted under 35 U.S.C. 154(b) by 187 days.

(21) Appl. No.: 15/918,027

(22) Filed: Mar. 12, 2018

(65) Prior Publication Data

US 2018/0268696 A1  Sep. 20, 2018

(30) Foreign Application Priority Data

Mar. 16, 2017 (JP) .................. 2017-051279

(51) Int. Cl.
*G08G 1/16* (2006.01)
*B62D 15/02* (2006.01)

(52) U.S. Cl.
CPC ............ *G08G 1/16* (2013.01); *B62D 15/021* (2013.01); *B62D 15/0265* (2013.01); *G08G 1/166* (2013.01)

(58) Field of Classification Search
None
See application file for complete search history.

(56) References Cited

U.S. PATENT DOCUMENTS

| | | | | |
|---|---|---|---|---|
| 9,956,963 | B2* | 5/2018 | Vijaya Kumar | B60W 40/08 |
| 10,386,845 | B1* | 8/2019 | Konrardy | G08G 1/146 |
| 10,421,460 | B2* | 9/2019 | Jiang | G05D 1/021 |
| 2009/0092284 | A1* | 4/2009 | Breed | B60J 10/00 |
| | | | | 382/103 |
| 2014/0336878 | A1* | 11/2014 | Yanai | G01D 5/145 |
| | | | | 701/41 |
| 2015/0175167 | A1* | 6/2015 | Sakima | G01B 21/10 |
| | | | | 702/157 |
| 2015/0291158 | A1* | 10/2015 | Okita | B60T 8/17558 |
| | | | | 701/1 |

(Continued)

FOREIGN PATENT DOCUMENTS

| | | |
|---|---|---|
| JP | 05-024524 A | 2/1993 |
| JP | 2004-280453 A | 10/2004 |

(Continued)

*Primary Examiner* — Christian Chace
*Assistant Examiner* — Amelia J. I. Vorce
(74) *Attorney, Agent, or Firm* — Sughrue Mion, PLLC

(57) ABSTRACT

A collision avoidance device includes an electronic control unit configured to: determine whether or not a driver of a host vehicle performs turn-back steering based on a detection value of a steering angle or steering torque detected by a steering sensor of the host vehicle; and execute the collision avoidance control for avoiding a collision between the host vehicle and an obstacle in a case where the electronic control unit determines that there is a collision possibility between the host vehicle and the obstacle based on a path of the host vehicle and a position of the obstacle, wherein the electronic control unit is configured not to execute the collision avoidance control while the electronic control unit determines that the driver of the host vehicle performs turn-back steering.

3 Claims, 5 Drawing Sheets

(56) References Cited

U.S. PATENT DOCUMENTS

2015/0353062 A1\* 12/2015 Breuer ..................... B60T 7/22
    701/70
2016/0152267 A1\* 6/2016 Morimoto ............ B62D 15/025
    701/41
2016/0207534 A1\* 7/2016 Nishimura ............ B60W 50/14

FOREIGN PATENT DOCUMENTS

| JP | 2011-3003 A | 1/2011 | |
|---|---|---|---|
| WO | WO-2016199799 A1 \* | 12/2016 | ............... B62D 6/00 |
| WO | WO-2017138444 A1 \* | 8/2017 | ............. B62D 11/06 |

\* cited by examiner

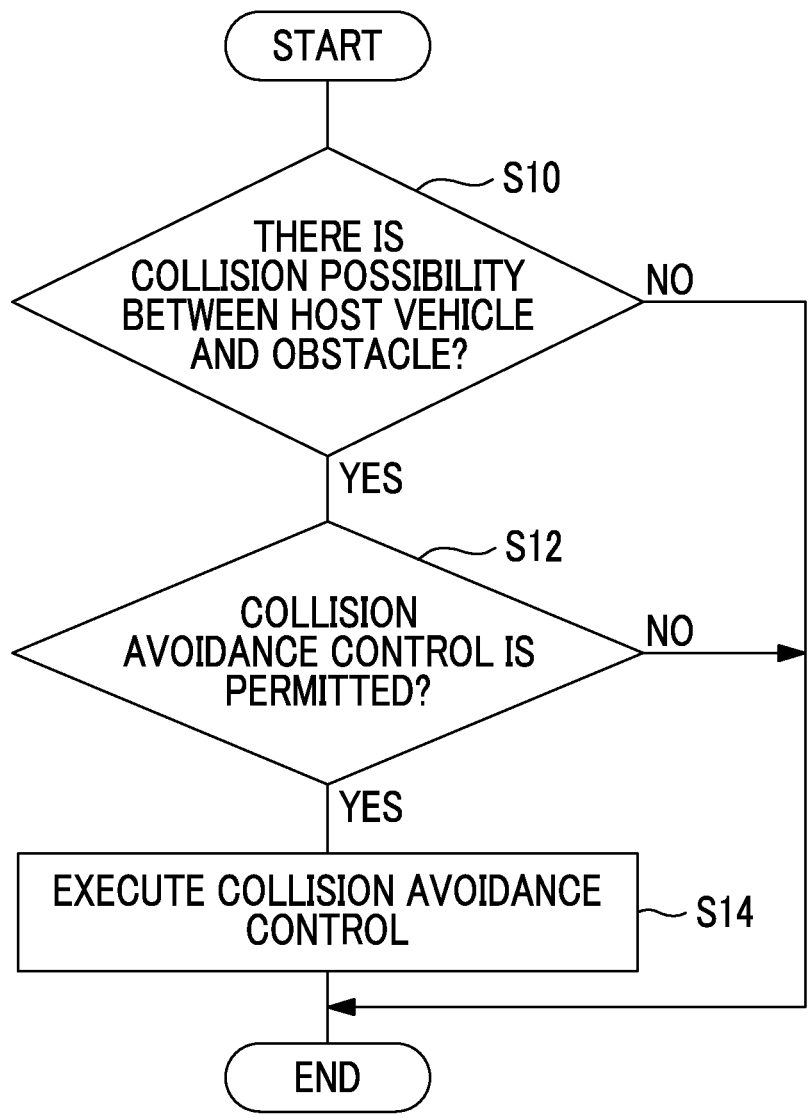

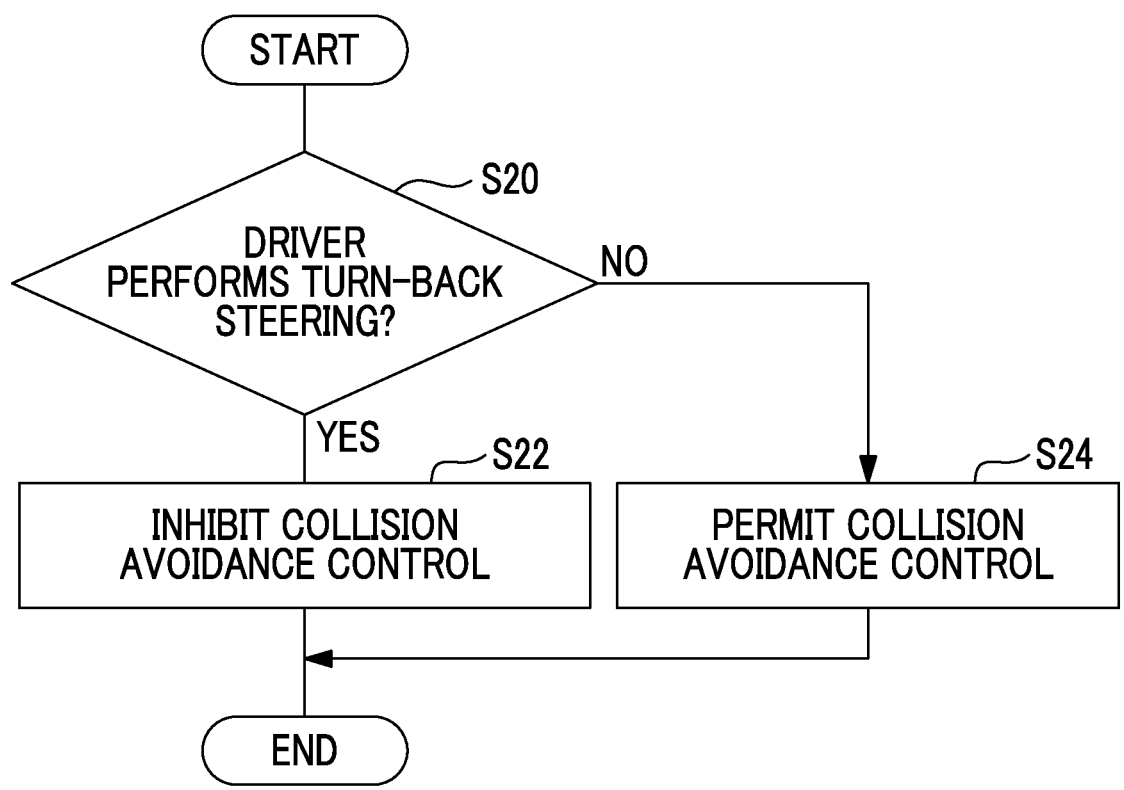

COLLISION AVOIDANCE DEVICE

INCORPORATION BY REFERENCE

The disclosure of Japanese Patent Application No. 2017-051279 filed on Mar. 16, 2017 including the specification, drawings and abstract is incorporated herein by reference in its entirety.

BACKGROUND

1. Technical Field

The present disclosure relates to a collision avoidance device.

2. Description of Related Art

In the related art, as a technical literature relating to collision avoidance at the time of a right turn of a host vehicle, Japanese Unexamined Patent Application Publication No. 2004-280453 (JP 2004-280453 A) is known. JP 2004-280453 A discloses a right turn safety confirmation system that sets a predicted right turn trajectory (a predicted trajectory at the time of the right turn) of the host vehicle in front of the right side of the host vehicle, and in a case where an oncoming vehicle reaches the predicted right turn trajectory within a needed right turn time set in advance, determines that there is a collision possibility between the oncoming vehicle and the host vehicle. In the right turn safety confirmation system, in a case where determination is made that there is a collision possibility between the oncoming vehicle and the host vehicle, a warning is issued to a driver for collision avoidance.

SUMMARY

On the other hand, when the above-described determination on a collision possibility is performed in a case where the host vehicle traveling on a road having two lanes per side performs lane change from a left lane to a right lane, it is considered that a predicted trajectory of the host vehicle enters an oncoming lane over the lane to be a lane change destination, and determination on a collision possibility between the oncoming vehicle traveling on the oncoming lane and the host vehicle is performed. As a result, there is a possibility that unneeded collision avoidance control (warning or the like) between the host vehicle performing lane change and the oncoming vehicle is executed.

The present disclosure provides a collision avoidance device capable of suppressing execution of unneeded collision avoidance control.

A first aspect of the disclosure relates to a collision avoidance device including an electronic control unit configured to: determine whether or not a driver of a host vehicle performs turn-back steering based on a detection value of a steering angle or steering torque detected by a steering sensor of the host vehicle; and execute collision avoidance control for avoiding a collision between the host vehicle and an obstacle in a case where the electronic control unit determines that there is a collision possibility between the host vehicle and the obstacle based on a path of the host vehicle and a position of the obstacle, wherein the electronic control unit is configured not to execute the collision avoidance control while the electronic control unit determines that the driver of the host vehicle performs turn-back steering.

With the collision avoidance device according to the first aspect of the disclosure, when the driver performs turn-back steering, the collision avoidance control is not executed; thus, determination on a collision possibility between another vehicle in an oncoming lane over a lane to be lane change destination during lane change and the host vehicle is performed, and it is possible to suppress execution of unneeded collision avoidance control.

In the collision avoidance device according to the first aspect of the disclosure, the steering sensor may be configured to detect one of the detection value of right-pointing steering and the detection value of left-pointing steering as a positive value and detect the other as a negative value; and the electronic control unit may be configured to determine that the driver of the host vehicle performs turn-back steering in a first case or a second case, the first case being that an average value of the past detection values of the steering sensor for multiple times set in advance is a positive value and a difference obtained by subtracting the average value from a present detection value of the steering sensor is a negative value, the second case being that the average value is a negative value and the difference obtained by subtracting the average value from the present detection value of the steering sensor is a positive value. With the collision avoidance device, since there is a case where the driver performs slight turn-back with a muscular reaction or the like even though the driver intends to steer in one direction, determination is performed using the average value of the past detection values of the steering sensor for multiple times, whereby it is possible to improve the determination accuracy of turn-back steering.

A second aspect of the disclosure relates to a collision avoidance device including a steering sensor configured to detect a steering angle or steering torque; and an electronic control unit configured to output a signal for executing collision avoidance control in a case where the electronic control unit determines that there is a collision possibility between a host vehicle and an obstacle based on a path of the host vehicle and a position of the obstacle, and determine whether or not a driver of the host vehicle performs turn-back steering based on a detection value of the steering angle or steering torque detected by the steering sensor, and output a signal for suppressing the collision avoidance control in a case where the electronic control unit determines that the driver of the host vehicle performs turn-back steering.

In the collision avoidance device according to the second aspect of the disclosure, the steering sensor may be configured to detect one of the detection value of right-pointing steering and the detection value of left-pointing steering as a positive value and detect the other as a negative value; and the electronic control unit may be configured to determine that the driver of the host vehicle performs turn-back steering in a first case or a second case, the first case being that an average value of the past detection values of the steering sensor for multiple times set in advance is a positive value and a difference obtained by subtracting the average value from a present detection value of the steering sensor is a negative value, the second case being that the average value is a negative value and the difference obtained by subtracting the average value from the present detection value of the steering sensor is a positive value.

The collision avoidance device according to the second aspect of the disclosure may further include an actuator configured to control a behavior of the vehicle, wherein the actuator may be configured to be driven based on a signal from the electronic control unit.

As described above, according to the aspects of the disclosure, it is possible to suppress execution of unneeded collision avoidance control.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein:

FIG. 4 is a flowchart showing collision avoidance control; and

FIG. 5 is a flowchart showing inhibition processing of the collision avoidance control.

DETAILED DESCRIPTION OF EMBODIMENTS

Figure 1:
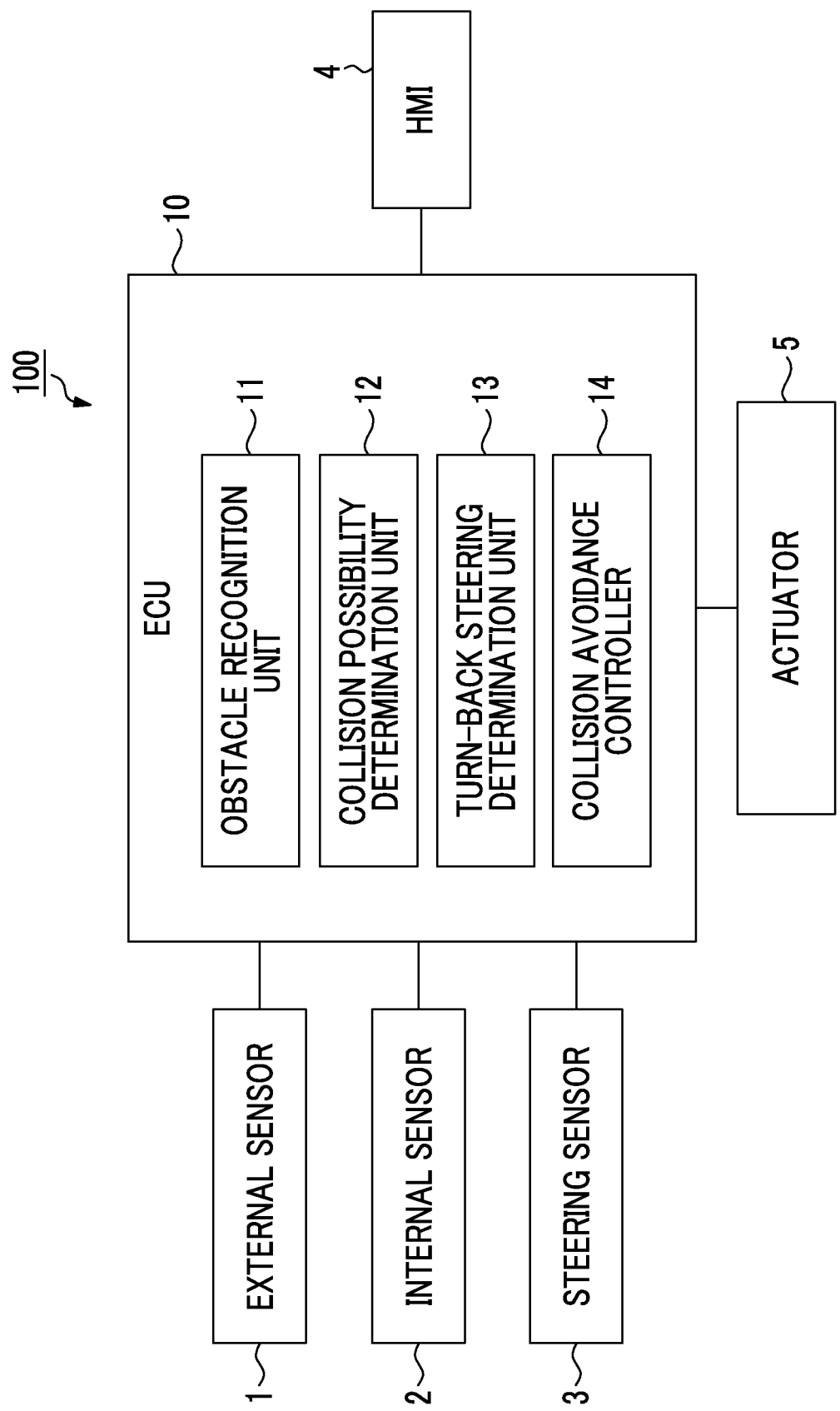
FIG. 1 is a block diagram showing a collision avoidance device according to an embodiment.

Hereinafter, an embodiment of the disclosure will be described referring to the drawings.

FIG. 1 is a block diagram showing a collision avoidance device according to the embodiment. A collision avoidance device 100 shown in FIG. 1 is mounted in a vehicle (host vehicle), such as a passenger vehicle, and determines a collision possibility between the host vehicle and an obstacle. The collision avoidance device 100 executes collision avoidance control for avoiding a collision between the host vehicle and the obstacle in a case where determination is made that there is a collision possibility between the host vehicle and the obstacle. The collision avoidance control in the embodiment is, as an example, control (right-turn oncoming vehicle precrash safety system [PCS] control) for avoiding a collision between an oncoming vehicle and the host vehicle at the time of the right turn of the host vehicle in a left-hand traffic country or zone.

Configuration of Collision Avoidance Device

As shown in FIG. 1, the collision avoidance device 100 according to the embodiment includes an electronic control unit [ECU] 10 that integrally manages the device. The ECU 10 is an electronic control unit having a central processing unit [CPU], a read only memory [ROM], a random access memory [RAM], a controller area network [CAN] communication circuit, and the like. In the ECU 10, for example, various functions are realized by loading a program stored in the ROM on the RAM and executing the program loaded on the RAM on the CPU. The ECU 10 may be constituted of a plurality of electronic units.

The ECU 10 is connected to an external sensor 1, an internal sensor 2, a steering sensor 3, a human machine interface [HMI] 4, and an actuator 5.

The external sensor 1 is detection equipment that detects conditions around the vehicle. The external sensor 1 includes at least one of a camera and a radar sensor.

The camera is imaging equipment that images external conditions of the vehicle. The camera is provided on a rear side of a windshield of the vehicle. The camera transmits imaging information relating to the external conditions of the vehicle to the ECU 10. The camera may be a monocular camera or a stereo camera. The stereo camera has two imaging units disposed so as to reproduce binocular parallax. Imaging information of the stereo camera includes information in a depth direction.

The radar sensor is detection equipment that detects an obstacle around the vehicle using electric waves (for example, millimeter waves) or light. Examples of the radar sensor include a millimeter-wave radar or light detection and ranging [LIDAR]. The radar sensor transmits electric waves or light around the vehicle and receives electric waves or light reflected from obstacles to detect obstacles. The radar sensor transmits detected obstacle information to the ECU 10. Examples of the obstacles include movable obstacles, such as pedestrians, bicycles, and other vehicles, in addition to fixed obstacles, such as guardrails and buildings.

The internal sensor 2 is detection equipment that detects a traveling state and a vehicle state of the host vehicle. The internal sensor 2 includes a vehicle speed sensor, an acceleration sensor, and a yaw rate sensor. The vehicle speed sensor is a detector that detects a speed of the host vehicle. As the vehicle speed sensor, for example, a wheel speed sensor that is provided in a wheel of the host vehicle, a drive shaft configured to rotate integrally with the wheel, or the like, and detects a rotation speed of the wheel is used. The vehicle speed sensor transmits detected vehicle speed information (wheel speed information) to the ECU 10.

The acceleration sensor is a detector that detects an acceleration of the host vehicle. The acceleration sensor includes, for example, a longitudinal acceleration sensor that detects a longitudinal acceleration of the host vehicle, and a lateral acceleration sensor that detects a lateral acceleration of the host vehicle. For example, the acceleration sensor transmits acceleration information of the host vehicle to the ECU 10. The yaw rate sensor is a detector that detects a yaw rate (rotational angular velocity) of the center of gravity of the host vehicle around a vertical axis. As the yaw rate sensor, for example, a gyro sensor can be used. The yaw rate sensor transmits detected yaw rate information of the host vehicle to the ECU 10.

The steering sensor 3 is a sensor that detects a steering angle of the host vehicle. The steering sensor 3 is provided in, for example, a shaft of a steering wheel of the host vehicle, and detects a steering angle of the steering wheel by the driver. For example, the steering sensor 3 detects a detection value of a steering angle of right-pointing steering as a positive value and a detection value of a steering angle of left-pointing steering as a negative value based on an initial position of the steering wheel. The steering sensor 3 performs the detection of the steering angle at each detection timing set in advance. The steering sensor 3 transmits the detection value of the detected steering angle to the ECU 10.

The steering sensor 3 may detect steering torque instead of the steering angle of the host vehicle. For example, the steering sensor 3 detects a detection value of steering torque of right-pointing steering as a positive value and a detection value of steering torque of left-pointing steering as a negative value based on the initial position of the steering wheel. The positive and negative of the above-described detection values may be reverse.

The HMI 4 is an interface that is provided to perform an input and output of information between the collision avoidance device 100 and an occupant. The HMI 4 includes, for example, a display, a speaker, and the like. The HMI 4 performs an image output of the display and a sound output from the speaker according to a control signal from the ECU 10. The display may be a head-up display. The HMI 4 includes, for example, input equipment (buttons, a touch panel, a sound input device, and the like) for reception of an input from the occupant.

The actuator 5 is equipment that is used for control of the host vehicle. The actuator 5 includes at least actuators for controlling a behavior of the vehicle, such as a throttle actuator, a brake actuator, and a steering actuator. The throttle actuator controls the amount (throttle valve opening degree) of air supplied to an engine according to a control signal from the ECU 10, and controls drive power of the host vehicle. In a case where the host vehicle is a hybrid vehicle, in addition to the amount of air supplied to the engine, a control signal from the ECU 10 is input to a motor as a power source and the drive power is controlled. In a case where the host vehicle is an electric vehicle, a control signal from the ECU 10 is input to a motor (a motor that functions as an engine) as a power source and the drive power is controlled. In these cases, the motor as a power source constitutes the actuator 5.

The brake actuator controls a brake system according to a control signal from the ECU 10, and controls braking force that is given to the wheels of the host vehicle. As the brake system, for example, a hydraulic brake system can be used. The steering actuator controls the drive of an assist motor configured to control steering torque in an electric power steering system according to a control signal from the ECU 10. With this, the steering actuator controls steering torque of the host vehicle.

A functional configuration of the ECU 10 will be described. The ECU 10 has an obstacle recognition unit 11, a collision possibility determination unit 12, a turn-back steering determination unit 13, and a collision avoidance controller 14.

The obstacle recognition unit 11 recognizes an obstacle around the host vehicle based on a detection result of the external sensor 1. The obstacle recognition unit 11 recognizes a position of an obstacle with respect to the host vehicle. The obstacle recognition unit 11 may recognize a relative moving direction of an obstacle with respect to the host vehicle. The obstacle recognition unit 11 may recognize the type of an obstacle (another vehicle, pedestrian, bicycle, or the like) using known methods.

The collision possibility determination unit 12 determines whether or not there is a collision possibility between the host vehicle and the obstacle based on a path of the host vehicle and the position of the obstacle. The collision possibility determination unit 12 estimates the path (predicted trajectory) of the host vehicle based on a detection result of the internal sensor 2. For example, the collision possibility determination unit 12 estimates the path of the host vehicle based on the yaw rate of the host vehicle detected by the yaw rate sensor and the vehicle speed of the host vehicle detected by the vehicle speed sensor. The collision possibility determination unit 12 may estimate the path as a turning circle of the host vehicle turning right or left from the yaw rate and the vehicle speed in the host vehicle turning right or left. The collision possibility determination unit 12 may estimate the path of the host vehicle from the direction of the host vehicle using other known methods.

The collision possibility determination unit 12 recognizes a temporal change (for example, a change in the position of the obstacle for the last 300 milliseconds) of the position of the obstacle based on a recognition result of the obstacle recognition unit 11. The collision possibility determination unit 12 performs correction corresponding to the estimation result of the path of the host vehicle on the temporal change of the position of the obstacle based on the estimated path of the host vehicle and the temporal change of the position of the obstacle, thereby performing coordinate conversion to a relative position in a planar coordinate system based on the host vehicle.

Figure 2:
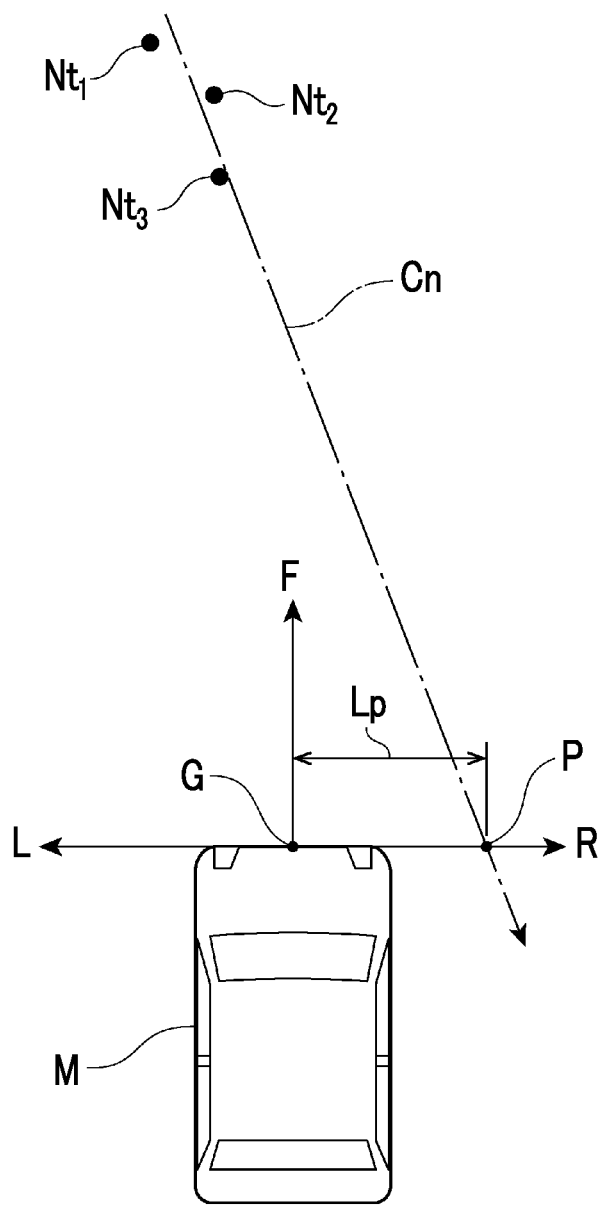
FIG. 2 is a plan view illustrating determination on a collision possibility between a host vehicle and an obstacle.

FIG. 2 is a plan view illustrating determination on a collision possibility between the host vehicle and an obstacle. Determination on a collision possibility between the host vehicle and an obstacle will be described referring to FIG. 2. FIG. 2 shows relative positions $Nt_1$ to $Nt_3$ of an obstacle at times $t_1$ to $t_3$ in a planar coordinate system based on a host vehicle M. In the planar coordinate system based on the host vehicle M, the center of a front end of the host vehicle M is set as a coordinate origin G, a coordinate axis extending in front of the host vehicle M is set as F, a coordinate axis extending in a right direction of the host vehicle M is set as R, and a coordinate axis extending in a left direction of the host vehicle M is set as L. The coordinate axis R and the coordinate axis L are collectively referred to as a lateral coordinate axis LR.

The collision possibility determination unit 12 performs correction of the estimation result of the path of the host vehicle M on an assumption that the vehicle speed of the host vehicle M is maintained, and performs coordinate conversion of the position of the obstacle recognized by the obstacle recognition unit 11 to the planar coordinate system based on the host vehicle M to obtain the relative positions $Nt_1$ to $Nt_3$ of the obstacle. The relative positions $Nt_1$ to $Nt_3$ of the obstacle can be obtained using known methods.

The collision possibility determination unit 12 performs linear approximation based on the relative positions $Nt_1$ to $Nt_3$ of the obstacle using known methods, such as random sample consensus [RANSAC], thereby obtaining a relative path estimation straight line Cn of the obstacle in the planar coordinate system based on the host vehicle M. The collision possibility determination unit 12 obtains an intersection point P of the relative path estimation straight line Cn of the obstacle and the lateral coordinate axis LR of the planar coordinate system.

The collision possibility determination unit 12 determines whether or not there is a collision possibility between the host vehicle M and the obstacle based on the distance Lp between the intersection point P and the coordinate origin G. The collision possibility determination unit 12 determines that there is no collision possibility between the host vehicle M and the obstacle in a case where the distance Lp between the intersection point P and the coordinate origin G is equal to or greater than a distance threshold. The collision possibility determination unit 12 determines that there is a collision possibility between the host vehicle M and the obstacle in a case where the distance Lp between the intersection point P and the coordinate origin G is less than the distance threshold. The distance threshold is a value set in advance. A determination method on a collision possibility between the host vehicle M and the obstacle is not limited to the above-described method.

The turn-back steering determination unit 13 determines whether or not the driver of the host vehicle M performs turn-back steering based on a detection result (steering information) of the steering sensor 3. Turn-back steering is an operation of the driver to steer the steering wheel in one direction and then to return a rotation angle of the steering wheel toward the initial position (reference position) of the steering wheel. A steering wheel of a steering mechanism of the host vehicle M does not need to be a steering wheel.

The turn-back steering determination unit 13 determines whether or not the driver performs turn-back steering according to a combination of the positive or negative sign of the steering angle detected by the steering sensor 3 last time and the positive or negative sign of a difference between the steering angle detected by the steering sensor 3 last time and the steering angle detected by the steering sensor 3 present time.

The turn-back steering determination unit 13 uses a filter (for example, an average value filter) for noise component elimination of the steering sensor 3. The turn-back steering determination unit 13 can use an average value of the past detection values of the steering sensor 3 for multiple times set in advance as the steering angle detected last time. The past detection values of the steering sensor 3 for multiple times set in advance are the past detection values of the steering sensor 3 for five times from the present detection as an example. The number of times can be set arbitrarily. A form may be made in which the steering sensor 3 calculates the average value of the past detection values of the steering sensor 3 for multiple times set in advance.

The turn-back steering determination unit 13 determines that the driver of the host vehicle M performs turn-back steering in a case where the average value of the past detection values of the steering sensor 3 for multiple times set in advance is a positive value and a difference obtained by subtracting the average value from a present detection value of the steering sensor 3 is a negative value or in a case where the average value is a negative value and the difference obtained by subtracting the average value from the present detection value of the steering sensor 3 is a positive value. Turn-back steering includes a case where the driver weakens strength to hold the steering wheel and the rotation angle of the steering wheel returns to the initial position with restoration force of the steering wheel.

In a case where the collision possibility determination unit 12 determines that there is a collision possibility between the host vehicle M and the obstacle, the collision avoidance controller 14 executes collision avoidance control for avoiding a collision between the host vehicle M and the obstacle. The collision avoidance control includes at least one of a warning to a driver of the host vehicle M, image display (display on the display) of an alert to the driver of the host vehicle M, braking control of the host vehicle M, and steering control of the host vehicle M. The collision avoidance controller 14 transmits a control signal to the HMI 4 or the actuator 5 to execute the collision avoidance control of the host vehicle M.

Even in a case where the collision possibility determination unit 12 determines that there is a collision possibility between the host vehicle M and the obstacle, while the turn-back steering determination unit 13 determines that the driver of the host vehicle M performs turn-back steering, the collision avoidance controller 14 does not execute the collision avoidance control.

Figure 3:
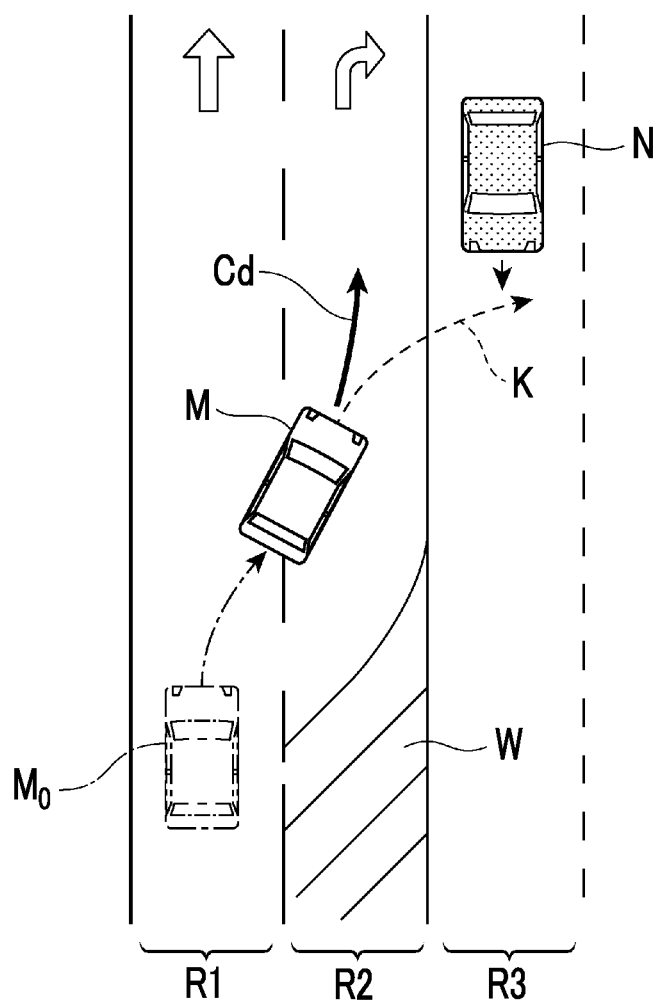
FIG. 3 is a plan view illustrating an example of suppressing unneeded collision avoidance control.

FIG. 3 is a plan view illustrating an example of suppressing unneeded collision avoidance control. FIG. 3 shows a condition in which the host vehicle M during lane change enters a lane to be a lane change destination and the driver starts turn-back steering.

FIG. 3 shows the host vehicle M during lane change, a position $M_0$ of the host vehicle M at the time of the start of lane change, a lane R1 to be a lane change origin of the host vehicle M, a lane R2 to be a lane change destination of the host vehicle M, a buffer zone (zebra zone) W of the lane R2, an oncoming lane R3 of the lanes R1, R2, and an oncoming vehicle N that travels on the oncoming lane R3. As an example, the lane R1 is a lane for straight traveling, and the lane R2 is a lane for the right turn. The oncoming lane R3 is adjacent to the lane R2 to be a lane change destination of the host vehicle M.

FIG. 3 shows a traveling direction Cd of the host vehicle M during lane change intended by the driver, and a path K of the host vehicle M estimated by the collision possibility determination unit 12. That is, in the condition shown in FIG. 3, even though the driver performs turn-back steering, the path K of the host vehicle M estimated from the yaw rate of the host vehicle M, or the like becomes a right-pointing curve (turning circle) and enters the oncoming lane R3. This is because a time difference (delay) occurs until steering of the driver is reflected in a vehicle behavior, such as the yaw rate, of the host vehicle M. With this, in the collision avoidance device of the related art, there is a possibility that determination is made that there is a collision possibility between the host vehicle M during lane change and the oncoming vehicle N, and unneeded collision avoidance control is executed. That is, there is a possibility that control of the right-turn oncoming vehicle PCS for avoiding a collision with the oncoming vehicle M at the time of the right turn of the host vehicle M, or the like is erroneously executed during lane change.

In the collision avoidance device 100 according to the embodiment, even though there is no reflection in the yaw rate of the host vehicle M, or the like, while determination is made that the driver of the host vehicle M performs turn-back steering, the collision avoidance control is not executed; thus, in the condition shown in FIG. 3, it is possible to suppress execution of unneeded collision avoidance control. In a right-hand traffic country or zone, the right and left of FIG. 3 are inverted; however, even in this case, the same effects are obtained.

Control of Collision Avoidance Device

Control of the collision avoidance device 100 according to the embodiment will be described.

Collision Avoidance Control

FIG. 4 is a flowchart showing the collision avoidance control. The flowchart shown in FIG. 4 is executed in a case where the host vehicle M detects an obstacle. Processing of the flowchart shown in FIG. 4 is performed as processing for right-turn oncoming vehicle PCS in a case where the vehicle speed of the host vehicle M is equal to or lower than a given value (for example, 20 km/h) when a blinker of the host vehicle M is turned on.

As shown in FIG. 4, the ECU 10 of the collision avoidance device 100 determines whether or not there is a collision possibility between the host vehicle M and an obstacle with the collision possibility determination unit 12 as S10. The collision possibility determination unit 12 determines whether or not there is a collision possibility between the host vehicle M and an obstacle based on the path of the host vehicle M and a position of the obstacle. In a case where determination is made that there is no collision possibility between the host vehicle M and the obstacle (S10: NO), the ECU 10 ends the present processing. Thereafter, the ECU 10 repeats the processing from S10 again after a given time elapses. In a case where determination is made that there is a collision possibility between the host vehicle M and the obstacle (S10: YES), the ECU 10 progresses to S12.

In S12, the ECU 10 determines whether or not the collision avoidance control is permitted. In a case where the collision avoidance control is not inhibited through inhibition processing of the collision avoidance control described below, the ECU 10 determines that the collision avoidance control is permitted. In a case where determination is made that the collision avoidance control is not permitted (S12: NO), the ECU 10 ends the present processing. Thereafter, the ECU 10 repeats the processing from S10 again in a case where a different obstacle is detected. In a case where determination is made that the collision avoidance control is permitted (S12: YES), the ECU 10 progresses to S14.

In S14, the ECU 10 executes the collision avoidance control for avoiding a collision between the host vehicle M and the obstacle with the collision avoidance controller 14. The collision avoidance controller 14 transmits a control signal to the HMI 4 or the actuator 5 to execute the collision avoidance control of the host vehicle M. Thereafter, the ECU 10 ends the present processing.

Inhibition Processing of Collision Avoidance Control

FIG. 5 is a flowchart showing inhibition processing of the collision avoidance control. Processing of the flowchart shown in FIG. 5 is performed during traveling of the host vehicle M.

As shown in FIG. 5, the ECU 10 determines whether or not the driver of the host vehicle M performs turn-back steering with the turn-back steering determination unit 13 as S20. The turn-back steering determination unit 13 determines that the driver of the host vehicle M performs turn-back steering in a case where the average value of the past detection values of the steering sensor 3 for multiple times set in advance is a positive value and the difference obtained by subtracting the average value from the present detection value of the steering sensor 3 is a negative value or in a case where the average value is a negative value and the difference obtained by subtracting the average value from the present detection value of the steering sensor 3 is a positive value.

In a case where determination is made that the driver of the host vehicle M performs turn-back steering (S20: YES), the ECU 10 progresses to S22. In a case where determination is made that the driver of the host vehicle M does not perform turn-back steering (S20: NO), the ECU 10 progresses to S24.

In S22, the ECU 10 inhibits the collision avoidance control with the collision avoidance controller 14. In S22, in a case where the collision avoidance control is already inhibited, the ECU 10 continues an inhibited state. Thereafter, the ECU 10 ends the present processing and repeats the processing from S20 again after a given time elapses.

In S24, the ECU 10 permits the collision avoidance control with the collision avoidance controller 14. In S24, in a case where the collision avoidance control is already permitted, the ECU 10 continues a permitted state. Thereafter, the ECU 10 ends the present processing and repeats the processing from S20 again after a given time elapses.

Functional Effects of Collision Avoidance Device

With the collision avoidance device 100 according to the embodiment described above, even in a case where determination is made that there is a collision possibility between the host vehicle M and the obstacle, when the driver performs turn-back steering, the collision avoidance control is not executed. For this reason, it is possible to suppress determination on a collision possibility between the oncoming vehicle N on the oncoming lane R3 over the lane to be a lane change destination and the host vehicle M during lane change, and execution of unneeded collision avoidance control.

In the collision avoidance device 100, in a case where the average value of the past detection values of the steering sensor 3 for multiple times set in advance is a positive value and the difference obtained by subtracting the average value from the present detection value of the steering sensor 3 is a negative value or in a case where the average value is negative value and the difference obtained by subtracting the average value from the present detection value of the steering sensor 3 is a positive value, determination is made that the driver of the host vehicle M performs turn-back steering. For this reason, it is possible to further improve the determination accuracy of turn-back steering. That is, in the collision avoidance device 100, since there is a case where the driver performs slight turn-back with a muscular reaction or the like while steering in one direction, determination is made using the average value of the past detection values of the steering sensor 3 for multiple times, whereby it is possible to further improve the determination accuracy of turn-back steering.

Although a preferred embodiment of the disclosure has been described as above, the disclosure is not limited to the above-described embodiment. The disclosure may be subjected to various modifications and improvements based on common knowledge of those skilled in the art including the embodiment described above.

For example, in the embodiment, although an example in a left-hand traffic country or zone has been described, the disclosure can be appropriately carried out in a right-hand traffic country or zone. The collision avoidance controller 14 may assume that lane change is performed to a right lane to the host vehicle M in a left-hand traffic country or zone.

That is, a form may be made in which, in a case where determination is made that there is a collision possibility between the host vehicle M and the obstacle, while the right blinker is in the turn-on state and determination is made that the driver performs turn-back steering, the collision avoidance controller 14 does not execute the collision avoidance control. Similarly, a form may be made in which, in a right-hand traffic country or zone, in a case where determination is made that there is a collision possibility between the host vehicle M and the obstacle, while the left blinker is in the turn-on state and determination is made that the driver performs turn-back steering, the collision avoidance controller 14 does not execute the collision avoidance control. Instead of the condition that the right blinker is in the turn-on state, a condition that the host vehicle M is turning right may be made. Determination on whether or not the host vehicle M is turning right can be performed from the yaw rate of the host vehicle M, or the like. Similarly, the condition that the left blinker is in the turn-on state can be replaced with the condition that the host vehicle M is turning left.

The collision possibility determination unit 12 may estimate a path of an obstacle on a map from the position of the obstacle. The collision possibility determination unit 12 may determine that there is a collision possibility in a case where the path of the host vehicle M and the path of the obstacle intersect each other and the distance between the host vehicle M and the obstacle is equal to or less than a threshold.

In a case where the collision possibility determination unit 12 determines that there is a collision possibility between the host vehicle M and the obstacle, when the collision avoidance control is permitted, the collision avoidance device 100 does not need to execute the collision avoidance control. In a case where the collision possibility determination unit 12 determines that there is a collision possibility between the host vehicle M and the obstacle, even when the collision avoidance control is permitted, the collision avoidance device 100 may determine the need for the execution of the collision avoidance control in consideration of various other conditions.

The turn-back steering determination unit 13 may determine turn-back steering of the driver using methods different from in the embodiment. The turn-back steering determination unit 13 may determine that the driver of the host vehicle M performs turn-back steering when a difference obtained by subtracting an absolute value of a present detection value of the steering sensor 3 from an average of absolute values of past detection values of the steering sensor 3 for multiple times set in advance is a positive value. As an example, the past detection values of the steering sensor 3 for multiple times set in advance is the past detection values of the steering sensor 3 for five times from the present detection.

That is, the turn-back steering determination unit 13 calculates the average of the absolute values of the past detection values of the steering sensor 3 for multiple times based on a detection result of the steering sensor 3. The turn-back steering determination unit 13 determines whether or not the difference obtained by subtracting the absolute value of the present detection value of the steering sensor 3 from the average of the absolute values of the past detection values of the steering sensor 3 for multiple times is a positive value. In a case where the difference is a positive value, since it is considered that the driver returns the steering wheel toward the initial position, the turn-back steering determination unit 13 determines that the driver performs turn-back steering.

The turn-back steering determination unit 13 does not need to use the average value filter, and may use a previous detection value (a detection value detected last time) of the steering sensor 3 instead of the past detection values of the steering sensor 3 for multiple times set in advance.

A form may be made in which, while the turn-back steering determination unit 13 determines that the driver of the host vehicle M performs turn-back steering, the collision avoidance device 100 does not perform determination on a collision possibility.

That is, while the turn-back steering determination unit 13 determines that the driver of the host vehicle M performs turn-back steering, the collision possibility determination unit 12 does not perform determination on whether or not there is a collision possibility between the host vehicle M and the obstacle.

Specifically, in the flowchart showing the inhibition processing of the collision avoidance control of FIG. 5, in S22, in a case where the collision avoidance control is inhibited, the processing of the flowchart showing the collision avoidance control of FIG. 4 may not be started. With this, while determination is made that the driver of the host vehicle M performs turn-back steering, the collision avoidance device 100 does not perform determination on a collision possibility, and thus, the collision avoidance control is not executed. Therefore, while determination is made that the driver of the host vehicle M performs turn-back steering, the collision avoidance device 100 does not execute the collision avoidance control, whereby it is possible to suppress execution of unneeded collision avoidance control.

What is claimed is:

1. A collision avoidance device comprising an electronic control unit configured to:

determine whether or not a driver of a host vehicle performs turn-back steering based on a detection value of a steering angle or steering torque detected by a steering sensor of the host vehicle; and execute collision avoidance control for avoiding a collision between the host vehicle and an obstacle in a case where the electronic control unit determines that there is a collision possibility between the host vehicle and the obstacle based on a path of the host vehicle and a position of the obstacle, wherein the electronic control unit is configured not to execute the collision avoidance control during a period in which the electronic control unit determines that the driver of the host vehicle performs turn-back steering, wherein:

the steering sensor is configured to detect one of the detection value of right-pointing steering and the detection value of left-pointing steering as a positive value and detect the other as a negative value; and the electronic control unit is configured to determine that the driver of the host vehicle performs turn-back steering in a first case or a second case, the first case being that an average value of the past detection values of the steering sensor is a positive value and a difference obtained by subtracting the average value from a present detection value of the steering sensor is a negative value, the second case being that the average value is a negative value and the difference obtained by subtracting the average value from the present detection value of the steering sensor is a positive value.

2. A collision avoidance device comprising:

a steering sensor configured to detect a steering angle or steering torque; and an electronic control unit configured to:

output a signal for executing collision avoidance control in a case where the electronic control unit determines that there is a collision possibility between a host vehicle and an obstacle based on a path of the host vehicle and a position of the obstacle, and determine whether or not a driver of the host vehicle performs turn-back steering based on a detection value of the steering angle or steering torque detected by the steering sensor, and output a signal for suppressing the collision avoidance control in a case where the electronic control unit determines that the driver of the host vehicle performs turn-back steering, wherein:

the steering sensor is configured to detect one of the detection value of right-pointing steering and the detection value of left-pointing steering as a positive value and detect the other as a negative value; and the electronic control unit is configured to determine that the driver of the host vehicle performs turn-back steering in a first case or a second case, the first case being that an average value of the past detection values of the steering sensor is a positive value and a difference obtained by subtracting the average value from a present detection value of the steering sensor is a negative value, the second case being that the average value is a negative value and the difference obtained by subtracting the average value from the present detection value of the steering sensor is a positive value.

3. The collision avoidance device according to claim 2, further comprising an actuator configured to control a behavior of the vehicle, wherein the actuator is configured to be driven based on a signal from the electronic control unit.

* * * * *